(12) United States Patent
Schmieder et al.

(10) Patent No.: US 12,661,719 B2
(45) Date of Patent: Jun. 23, 2026

(54) SELF-LOCKING CLAMPING SYSTEM FOR A HOLLOW SHAFT

(71) Applicant: WTO Vermögensverwaltung GmbH, Ohlsbach (DE)

(72) Inventors: Markus Schmieder, Berghaupten (DE); Karlheinz Jansen, Schutterwald (DE)

(73) Assignee: WTO Vermögensverwaltung GmbH, Ohlsbach (DE)

( * ) Notice: Subject to any disclaimer, the term of this patent is extended or adjusted under 35 U.S.C. 154(b) by 603 days.

(21) Appl. No.: 18/030,819

(22) PCT Filed: Oct. 15, 2021

(86) PCT No.: PCT/EP2021/078617

§ 371 (c)(1),
(2) Date: Apr. 7, 2023

(87) PCT Pub. No.: WO2022/079241

PCT Pub. Date: Apr. 21, 2022

(65) Prior Publication Data

US 2023/0405689 A1      Dec. 21, 2023

(30) Foreign Application Priority Data

Oct. 16, 2020    (DE) ..................... 10 2020 127 366.5

(51) Int. Cl.
B23B 31/26            (2006.01)

(52) U.S. Cl.
CPC ........ B23B 31/265 (2013.01); B23B 2231/04 (2013.01); B23B 2231/20 (2013.01)

(58) Field of Classification Search
CPC ....... B23B 29/046; B23B 29/04; B23B 29/20; B23B 31/22; B23B 31/1071; B23B 31/265; B23B 31/4033; B23B 31/103; B23B 2231/46; B23B 2231/24; B23B 2260/03; B23B 2260/034
See application file for complete search history.

(56) References Cited

U.S. PATENT DOCUMENTS

| | | | |
|---|---|---|---|
| 4,997,325 A | 3/1991 | Heel et al. | |
| 7,195,431 B2* | 3/2007 | Greif ..................... | B23B 31/261 |
| | | | 279/900 |
| 7,393,311 B1* | 7/2008 | Giovanelli ........... | B23Q 17/003 |
| | | | 483/1 |
| 10,124,414 B2* | 11/2018 | Greif ................... | B23B 31/4053 |
| 2005/0220556 A1* | 10/2005 | Takase .................. | B23B 31/263 |
| | | | 409/233 |
| 2005/0232720 A1* | 10/2005 | Lu .......................... | B23B 31/28 |
| | | | 409/233 |
| 2006/0034670 A1* | 2/2006 | Sugita ..................... | B23Q 5/10 |
| | | | 409/231 |

(Continued)

FOREIGN PATENT DOCUMENTS

| | | |
|---|---|---|
| CN | 101254551 A | 9/2008 |
| DE | 3807140 A1 | 12/1988 |

(Continued)

OTHER PUBLICATIONS

Translated Notice of Reasons for Refusal, Application No. 2023-518500, Dated Dec. 20, 2024, Entire document.

(Continued)

*Primary Examiner* — Nicole N Ramos
(74) *Attorney, Agent, or Firm* — BOND, SCHOENECK & KING, PLLC; George R. McGuire

(57)            ABSTRACT

A self-locking clamping system for hollow shaft adapters is proposed.

21 Claims, 7 Drawing Sheets

(56) References Cited

U.S. PATENT DOCUMENTS

| | | | | |
|---|---|---|---|---|
| 2007/0110533 A1 * | 5/2007 | Geissler | | B23Q 5/10 |
| | | | | 409/231 |
| 2007/0154274 A1 * | 7/2007 | Petrescu | | B23B 31/265 |
| | | | | 409/233 |
| 2008/0161176 A1 * | 7/2008 | Kitaura | | B23B 31/28 |
| | | | | 409/233 |
| 2009/0162157 A1 * | 6/2009 | Makino | | B23Q 1/70 |
| | | | | 408/56 |
| 2011/0166692 A1 * | 7/2011 | Horn | | B23B 51/06 |
| | | | | 700/160 |
| 2016/0107241 A1 * | 4/2016 | Da Silva | | B23B 29/03417 |
| | | | | 408/56 |
| 2023/0405689 A1 * | 12/2023 | Schmieder | | B23B 29/046 |
| 2025/0018478 A1 * | 1/2025 | Schmieder | | B23B 29/242 |

FOREIGN PATENT DOCUMENTS

| | | | |
|---|---|---|---|
| DE | 19618610 A1 | 11/1996 | |
| DE | 10150773 A1 | 5/2003 | |
| DE | 10159611 C1 | 5/2003 | |
| DE | 202004017837 U1 | 1/2005 | |
| DE | 102004035993 A1 | 3/2006 | |
| DE | 102011119434 A1 * | 5/2013 | ......... B23B 31/1079 |
| DE | 102012108143 A1 | 5/2014 | |
| DE | 102011116572 B4 * | 9/2015 | ............ B23B 1/265 |
| DE | 102018111975 A1 | 5/2022 | |
| EP | 0471197 A1 | 2/1992 | |
| JP | 2020506075 A | 2/2020 | |
| WO | 2018215636 A1 | 11/2018 | |

OTHER PUBLICATIONS

International Search Report and Written Opinion CT/EP2021/078617, filed Oct. 15, 2021. pp. 1-10.
German Search Report, pp. 1-7.
International Preliminary Report on Patentability, pp. 1-16.
Translated CN Office Action; Application No. 202180070169.2; Dated May 21, 2025, Entire document.

* cited by examiner

→ Direction of movement of the parts

SELF-LOCKING CLAMPING SYSTEM FOR A HOLLOW SHAFT

CROSS-REFERENCE TO RELATED APPLICATION

The present application is a U.S. National Stage application based on International Application PCT/EP2021/078617, filed Oct. 15, 2021, which claims priority to German Application No. 10 2020 127 366.5, filed Oct. 16, 2020, the entirety of each of which is hereby incorporated by reference.

BACKGROUND

Clamping systems with a hollow shaft and a complementary shaped centering mount, for example according to ISO 12164 or ISO 26623, have proven themselves on the market for many years.

Among other things, they are used in driven or fixed tool holders. Then, the centering mount and the clamping system are integrated in the spindle of the driven tool holder or in the housing of the tool holder. The hollow shaft is part of an adapter that carries a drill, lathe tool or other tool.

The known clamping systems for clamping such a hollow shaft comprise a collet consisting of multiple clamping segments. The clamping segments are arranged around a tension bolt. An axial movement of the tension bolt relative to the clamping segments forces them radially outward. This initially results in a positive-locking fit with the hollow shaft at the front ends of the clamping segments. A further movement of the tension bolt creates an axial clamping force, which the clamping segments exert on the hollow shaft of the adapter, such that the adapter is pulled into the centering mount. An example of such a clamping system is known from EP 2 164 662.

Such clamping system is not self-locking. As a result, an actuating force must constantly act on the clamping system during operation of the tool holder in order to maintain the clamping force. Otherwise, the clamping system would come loose.

This is very difficult to realize, especially with a hydraulic clamping system in a rotating spindle of a driven tool holder. If the actuating force and consequently the clamping force is applied by a spring arranged in the tool holder, this represents an increased requirement for installation space. In addition, the force required to release the clamping system is greater, since the force of the tension spring must also be overcome.

A clamping device that has a self-locking mechanism is known from EP 1 924 379 B1. The clamping process is performed by a clamping head 6, which cooperates with clamping claws 5 in a manner known per se. A tension bolt 4 is mounted in front of the clamping head 6, which tension bolt is moved in the axial direction by an actuating device in order to clamp or release the clamping device. A two-piece draw tong 7 and a clamping sleeve 11 are provided between the tension bolt 4 and the clamping chuck 6. During tensioning, an offset 15 of the tension bolt 4 abuts an inner collar of the draw tong 7, such that the movement of the tension bolt 4 is transmitted directly to the tensioning head 6 via the draw tong 7. After the tension bolt has traveled a certain distance, the halves of the draw tong 7 deflect radially outward. This cancels the positive-locking fit between the half-shells of the draw tong 7 and the tension bolt.

In the further course of the clamping process, the draw tong 7 is only slightly dragged along in the axial direction, but is instead wedged between a conical head 12 of the tension bolt 4 and a clamping sleeve 11 mounted in a manner fixed to the housing until the desired self-locking is achieved.

Such device is complicated in structure; in addition to the clamping chuck and the tension bolt, it also requires a two-piece draw tong and a clamping sleeve 11. In addition, it requires a relatively large travel of the tension bolt, necessitates a large amount of installation space and is expensive to manufacture.

Another clamping device with self-locking is known from DE 196 18 610 A1 in the field of machine tools. Self-locking arises at the front end of the clamping segments. However, such self-locking is not sufficient. Therefore, an additional securing device is required. Such additional securing device comprises a compression spring, which presses wedge segments against a cone-shaped/conical part of the tension bolt, such that the spring force of such compression spring creates a frictional connection to the spindle via the wedge segments. Such frictional connection counteracts the unintentional opening of the clamping set. Such solution also requires a large amount of installation space and is expensive to manufacture. Furthermore, in addition to the frictional forces, the force of the compression spring must also be overcome to release the clamping system. This signifies high forces, which in turn require a large cylinder assembly, which is also disadvantageous.

SUMMARY OF THE INVENTION

The invention is based on the object of providing a clamping system that is self-locking and has a highly compact, simple and robust structure. Such compact design is particularly important if there is not much space. This is the case, for example, on turrets on centers of rotation. Here, the clamping system must be able to be mounted flexibly in various positions and orientations in upright and driven tool holders. Thereby, the installation space is severely restricted, for example, by permissible pivot diameters, width of the screw-on surface and the interface to the center of rotation.

According to the invention, such object is achieved with a clamping device for a hollow shaft, in particular a hollow shaft taper with a circular or polygonal outer contour, comprising one or more clamping segments and a tension bolt cooperating with the clamping segments, wherein each clamping segment has a front clamping claw at a front end on its outer side and a front lug on its inner side cooperating with the tension bolt, wherein each clamping segment has a rear clamping claw at a rear end on its outer side and a rear lug on its inner side cooperating with the tension bolt, wherein, in the clamping position, the front clamping claw of each clamping segment engages in a clamping groove of the hollow shaft and the rear clamping claw is pressed against a cone of an adjacent part or a spindle, wherein, in the open position, the front clamping claw(s) do(es) not engage in the clamping groove of the hollow shaft, wherein, by means of axial displacement, the tension bolt moves the clamping segments from the clamping position to the open position and from the open position to the clamping position, wherein the clamping segment or segments perform(s) a first pivoting movement during the transition from the open position to the clamping position, such that the front clamping claws of the clamping segments engage in a positively-locking manner in the clamping groove and form a joint for a subsequent second pivoting movement of the clamping segments, wherein, during the second pivoting movement, the rear lugs of the clamping segment or segments slide on a third cone section of the tension bolt and press the rear clamping claws of the clamping segments against the cone of the adjacent part or the spindle and axially clamp the clamping segment or segments, in that, during a further axial movement of the tension bolt following the second pivoting movement, the rear lugs of the clamping segment or segments slide on a second cone section of the tension bolt, such that a self-locking effect is produced between the clamping segments and the tension bolt at the rear end of the tension bolt.

The movement sequences matched to one another according to the invention achieve a positive-locking connection between the front clamping claw of the clamping segments and a clamping groove of the hollow shaft in a first pivoting movement. From then on, such positive-locking connection at the front end of the clamping segments serves as a pivot point/bearing for the clamping segment or segments. Subsequently, in a second pivoting movement, the rear end of the clamping segments is pressed radially outward against the cone of the adjacent part or the spindle, thereby building up an axial clamping force. In a subsequent further movement of the tension bolt, the axial clamping force is further increased. At the same time, a self-locking effect is created between the rear lugs of the clamping segments and the second cone section of the tension bolt. Self-locking arises at the rear end of the tension bolt. Among other things, this has the positive effect that the tension bolt is clamped and fixed at the front end and at the rear end.

According to the invention, no additional components of the clamping system are required in order to produce an operationally reliable self-locking effect. Rather, the desired self-locking effect is achieved by designing the tension bolt according to the invention and matching it with the clamping segments and the cone. As a result, the solution according to the invention is highly compact and is also highly advantageous in terms of production and cost. Another advantage is that the actuating forces for clamping and releasing are relatively small and do not differ greatly in magnitude. Naturally, the actuating force required for clamping is somewhat greater than the actuating force required for release.

The approximately equal forces for clamping and releasing are a particular advantage if the clamping system is operated automatically, with the aid of an actuator such as a hydraulically actuated cylinder assembly. The dimensions of such an actuator are usually determined by the maximum actuating force.

Another advantage of the clamping system according to the invention is that, after the second pivoting movement, if the rear lugs of the clamping segment or segments slide on a second cone section of the tension bolt, there is an increase in the axial tensioning of the clamping segments, such that the hollow shaft is pulled into the adjacent part or spindle with a greater force (booster function).

Furthermore, in the clamping system according to the invention, the tension bolt is centered at its front end by the front lugs of the clamping segments in the clamping groove of the hollow shaft and at its rear end by the rear lugs of the clamping segments in the cone. As a result, the clamping system has no imbalance or only a very small imbalance. This improves the machining quality of workpieces machined with a tool clamped in the hollow shaft and, in the case of driven tools, allows machining at very high spindle speeds.

Another advantage of the clamping system according to the invention is that the shape of the front lugs and the clamping groove can be designed relatively freely. It can be used with the following systems, among others: ISO 12164 (HSK) or ISO 26623(CoromantCapto).

In an advantageous embodiment of the invention, a first cylindrical section, a first cone section, a second cylindrical section, the second cone section, the third cone section and a third cylindrical section are successively formed on the tension bolt, starting from its front end FE. During the first pivoting movement, the front lug slides on the first cone section. During the second pivoting movement, the rear lug slides on the third cone section. During the subsequent pivoting movement caused by a further axial movement of the tension bolt, the rear lug slides on the second cone section and the self-locking effect is built up.

Self-locking means that, once the clamping system has been tensioned, no further actuating force needs to be applied to the tension bolt, the tension bolt remains in its position due to the self-locking effect, and a sufficiently large clamping force is still applied.

In other words: If the tension bolt is actuated hydraulically, the cylinder assembly actuating the tension bolt can be depressurized after tensioning, without affecting the tension of the clamping system or adapter according to the invention.

This is a great advantage, in particular if the clamping system is installed in a rotating spindle and the spindle rotates during machining. In this case, an actuating force does not have to be applied continuously to maintain the clamping force, as is the case with other systems; rather, the clamping force is maintained in the clamping system due to self-locking.

It is also not necessary to integrate a spring that rotates with the spindle and permanently applies an actuating force. The disadvantages of this solution are that the spring can cause an imbalance and, in addition to the frictional forces, the force of the spring must also be overcome to release the clamping system. This signifies high actuating forces, which in turn require a large cylinder assembly, which is also disadvantageous.

The cone is an internal cone and can be either directly incorporated into the housing, an adjacent part or a spindle. Alternatively, it is also possible to provide a threaded ring in which the cone is incorporated. Such threaded ring is then screwed into the housing, the adjacent part or the spindle. Of course, the connection does not have to be a threaded connection between the ring and the housing. Other connections can also be used to center the cone radially and hold it in position axially in the direction of the clamping force, such as a bore-cylinder pairing with a securing ring for axial positioning.

It has proved advantageous if the angle of inclination of the second cone section is less than 5° or less than the arc tangent of the coefficient of friction p produced by the pairing of the contact surfaces of the clamping segment and the tension bolt. This provides self-locking in a simple and very safe way. Of course, when determining the coefficient of friction and thus also the angle of inclination of the second cone section, it is also advisable to take into account the influences of fluids, such as oil or cooling lubricant, the surface finish, the material pairing, a possible coating and additional safeguards for loosening due to vibrations. If such circumstances are also taken into account, self-locking can be ensured under all conditions occurring during operation.

In many cases, it has proven sufficient or advantageous if the angle of inclination of the second cone section is in a range between 3° and 5°. 4° has proven to be a very good value.

In contrast, the angles of inclination of the first cone section and the third cone section are much larger. They are in a range between 30° and 60°, preferably the angle of inclination of both sections is equal to 45°.

With the tension bolt according to the invention, it is provided that the second cone section and the third cone section merge into one another without a diameter change and without an intermediate cylindrical section. This minimizes the required clamping travel of the tension bolt. The transition between the two cone sections takes place without interruption.

The front lugs of the clamping segments have (starting at the front end) a first contact surface matched to the angle of inclination of the first cone section of the tension bolt and a second contact surface matched to the cylindrical section. This optimally controls the first pivoting movement during which the front clamping claws of the clamping segments enter the clamping groove of the hollow shaft.

"Matched" in this connection means that the contact surfaces between the lugs of the clamping segments and the tension bolt in the various positions of the tension bolt relative to the clamping segments are as large as possible and that no highly loaded edge supports arise, in order to reduce surface pressure and wear. Therefore, the angles of inclination are mostly the same.

However, it is also possible, for example, for the shape of the contact surfaces to be slightly crowned or barrel-shaped, in order to prevent edge supports that can result from the pivoting movements of the clamping segments. Similarly, the cylindrical sections of the tension bolt may be designed to be slightly barrel-shaped.

To increase the self-locking effect of the clamping system according to the invention, it may be advantageous to design the first cylinder section as a cone with a negative angle of inclination α of small magnitude.

The angle of inclination α of the first cylinder section can be positive or negative. Despite the resulting linguistic "inaccuracy," the first cylinder section is also referred to when it has a small angle of inclination and is therefore, strictly speaking, a fourth cone section.

The magnitude of the angle of inclination α can be equal to or less than 4°. It is less than the angle of inclination of the second cone section on the tension bolt for a negative angle of inclination α. A positive angle of inclination α can increase the clamping travel and, like the second cone section, can have an angle of inclination less than the arc tangent (arctan) of the coefficient of friction p.

With a negative angle of inclination α, the cone at the front end of the tension bolt (=first cylinder section) is directed the same as the cone in the threaded ring; it is directed opposite to the second cone section and the third cone section of the tension bolt. In FIG. 8, a negative angle of inclination α is illustrated.

Accordingly, with a negative angle of inclination α, the cone at the front end of the tension bolt (=first cylinder section) and the cone in the threaded ring are directed in opposite directions; a positive angle of inclination can be useful, for example, with HSK, in order to increase the clamping travel, since the gripper groove there is designed in a wedge shape.

Self-locking means that the tension bolt is prevented by design measures from moving from the clamping position to the open position due to imbalance, vibration, pressure surges of the cooling lubricant, or other external forces that may act on it during operation. This would be a movement in the direction of the centering mount.

Due to the optional negative angle of inclination α, radial forces acting from the front lugs of the clamping segments on the first cylinder section cause an axial force on the tension bolt in the direction of the clamping position.

In a further advantageous embodiment, the rear lugs of the clamping segments have a third contact surface matched to the angle of inclination of the third cone section and a fourth contact surface at their rear end matched to the second cone section.

This means that initially the second pivoting movement is controlled by the third cone section of the tension bolt.

Subsequently, after a large part of the radial stroke and a certain (usually still insufficient) clamping force has been achieved, further tensioning takes place between the tension bolt and the rear lugs of the clamping segments and between the rear clamping claws of the clamping segments and the cone in the threaded ring or the spindle housing. The rear lugs of the clamping segments slide on the second cone section. The angle of inclination of the second cone section is significantly less than the angle of inclination of the third cone section. This reduces the reduction ratio between the axial movement of the tension bolt and the pivoting movement of the clamping segments at their rear end; i.e., the same axial movement of the tension bolt results in a smaller radial movement of the clamping segments. As a result, the axial clamping forces of the clamping segments and thus also the axial or clamping force acting on the hollow shaft increase (assuming a constant axial force of the tension bolt). (Booster function). In other words: Despite relatively small displacement forces acting on the tension bolt, the required clamping force is achieved such that the clamping segments pull the adapter into the centering mount with great force.

Due to the small angle of inclination of the second cone section, relatively large radial forces arise, which forces are transmitted safely and without overloading the components via a large contact surface between the second cone section of the tension bolt and the fourth contact surfaces on the rear lugs of the clamping segments.

Among other things, this makes the solution according to the invention highly durable, it wears little or not at all, and the surface pressure between the lugs and the second cone section of the tension bolt remains within the permissible values.

The angle of inclination of the cone in the threaded ring or housing and the correspondingly matched fifth contact surface on the rear clamping claws of the clamping segments is preferably in a range of 20° to 45°. An angle of inclination in the range of 25° to 40°, in particular 30° or 35°, has proved to be highly suitable.

In a further advantageous embodiment, the clamping segments are supported with their rear end against a spring-loaded intermediate disk or directly against a compression spring such that the clamping segments can deflect in the axial direction during the clamping process.

In the event of incorrect clamping, if the front lugs of the clamping segments slide on the first cone section and the front clamping claws cannot enter the clamping groove of the hollow shaft due to incorrect positioning of the hollow shaft, the clamping segments, if they abut the hollow shaft, can move rearward together with the tension bolt against the force of a spring (see FIGS. 9 and 10) and are also in a manner decoupled from the forces on the tension bolt.

This prevents damage to the clamping system if, which is of course undesirable, the adapter is not in the correct position relative to the centering mount or the tension bolt at the start of the clamping process. Therefore, the clamping system according to the invention is also fault-tolerant and a malfunction does not lead to a total loss of the clamping system.

Further advantages and advantageous embodiments of the invention can be seen in the following drawings, their descriptions and the patent claims. All features disclosed in the drawings, their descriptions and the patent claims can be essential to the invention, both individually and in any combination with one another.

BRIEF DESCRIPTION OF THE DRAWINGS

Figures

In the drawings.

DESCRIPTION OF THE EXEMPLARY EMBODIMENT

The adapter 1 to be clamped is inserted manually or automatically into a centering mount 3.

In connection with the invention, the term "adapter" is used as a generic term for all components or assemblies that can be tensioned in a centering mount 3 with the aid of the clamping system according to the invention. This can be a tool, a tool holder (drill chuck), a device or pallet for clamping workpieces, and many others.

Figure 1:
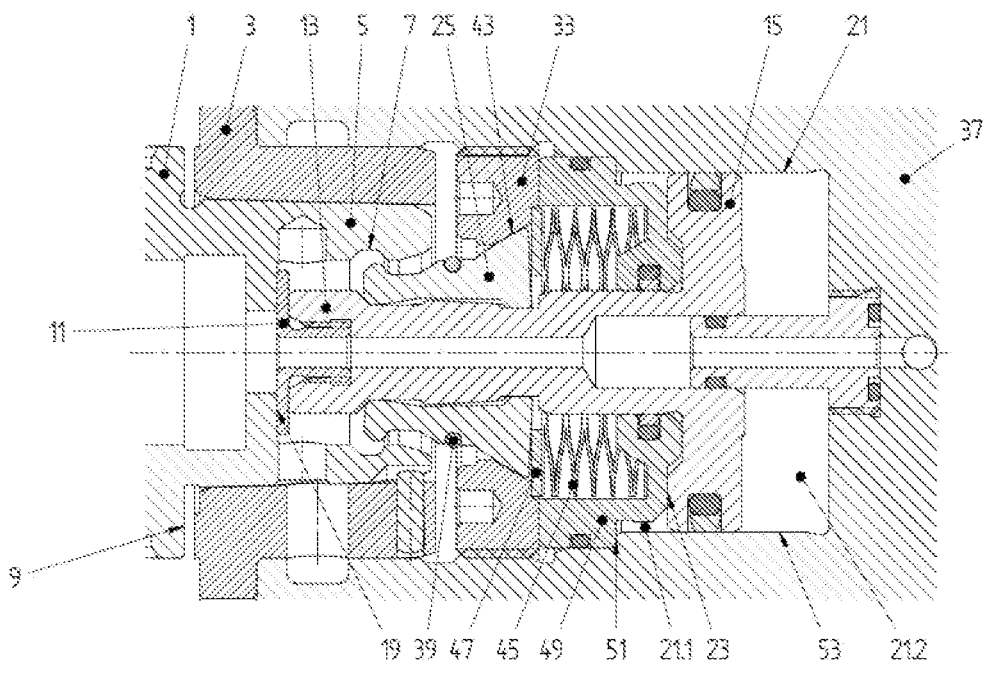
FIGS. 1 to 5 show a first exemplary embodiment of the invention in a longitudinal section in various positions.

FIG. 1 shows the first exemplary embodiment of a clamping system according to the invention with self-locking in the open position or the released position.

Figure 5:
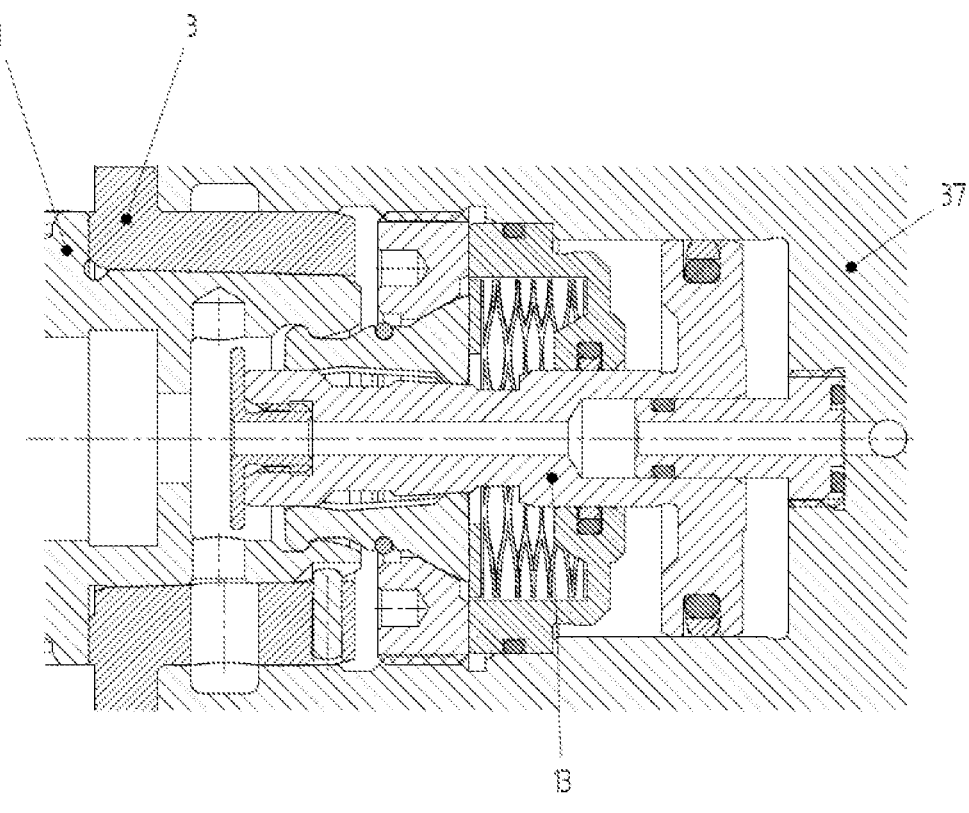

FIG. 5 shows the same clamping system in the clamping position with self-locking.

Figure 2:
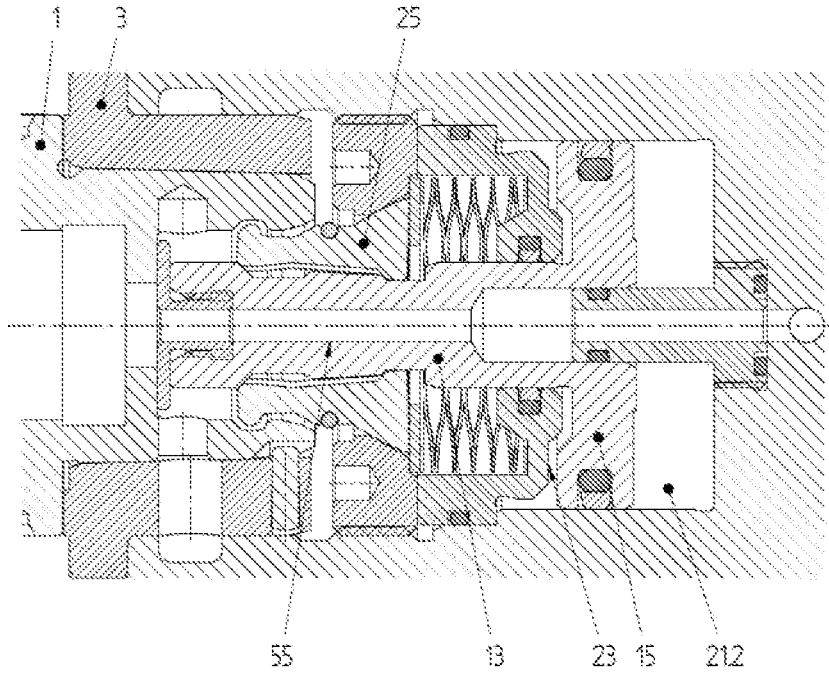
Figure 3:
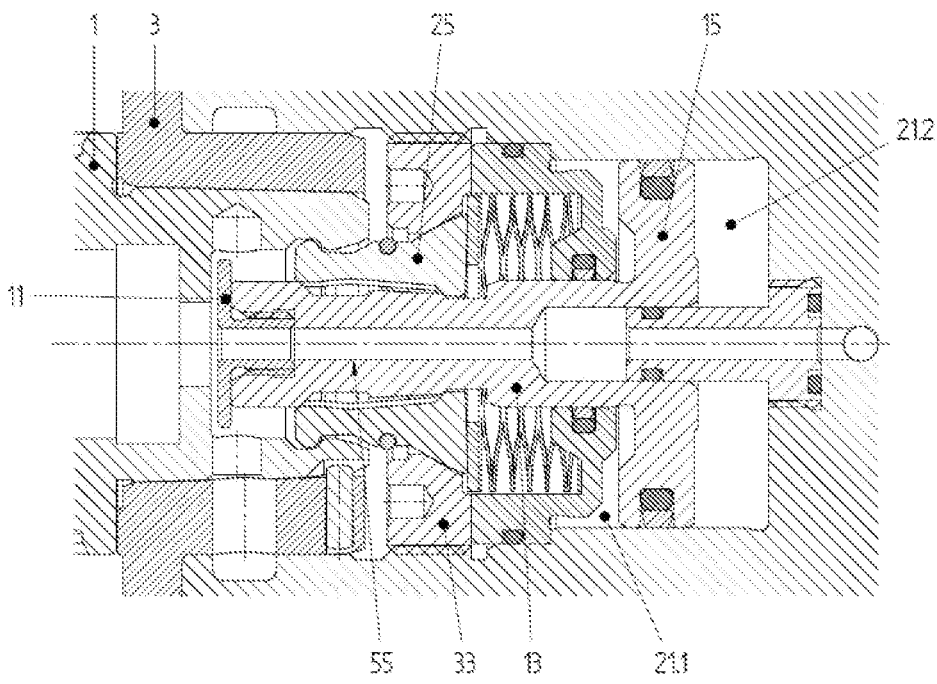
Figure 4:
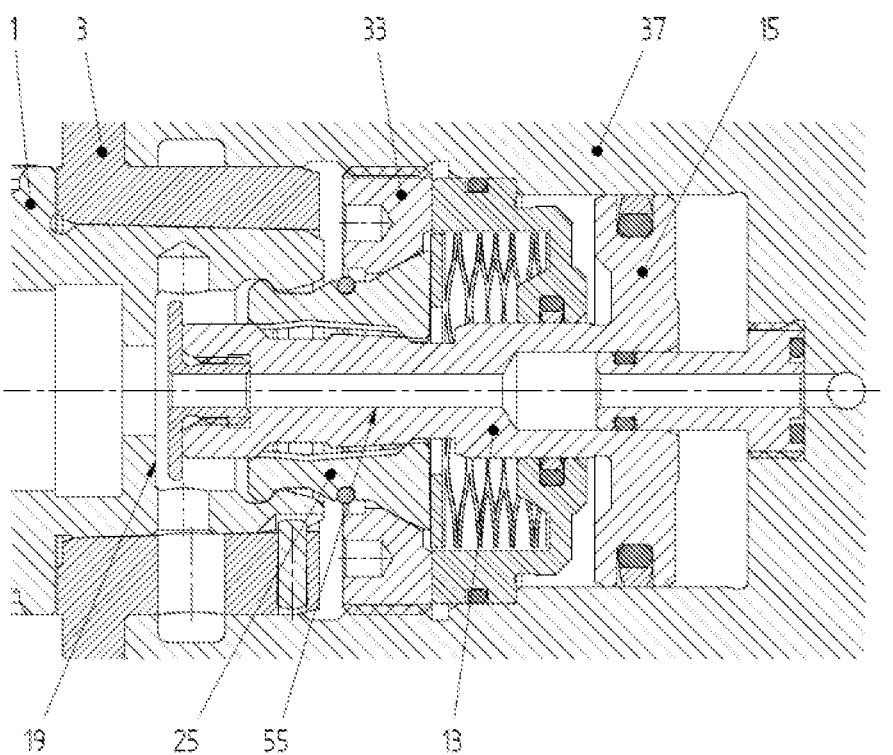

FIGS. 2 to 4 show intermediate positions of the clamping system, with which the operation of the clamping system is explained. When the clamping system is released, starting from the clamping position with self-locking shown in FIG. 5, the positions shown in FIGS. 4 to 1 are passed through, i.e., in the reverse order to that for clamping.

In all figures, the same reference signs are used for the same components. For reasons of clarity, not all reference signs are marked in each figure.

FIG. 1 shows an adapter 1 to be clamped. It is not part of the clamping system according to the invention; rather, it is tensioned by it in a centering mount 3.

In the exemplary embodiment shown in FIGS. 1 to 5, the centering mount 3 is a separate component that is inserted into the spindle 37.

The adapter 1 comprises a hollow shaft 5 that cooperates with the clamping device according to the invention. For this purpose, the hollow shaft 5 has a clamping groove 7 and an end face 9.

The hollow shaft 5 is usually immersed in a centering mount 3, since in machine tools the hollow shaft 5 of the adapter 1 and the centering mount 3 cooperate axially and radially without clearance. The requirements for concentricity and axial run-out of the adapter 1 and the torques that can be transmitted between the centering mount 3 and the hollow shaft 5 are becoming increasingly stringent. The hollow shaft 5 and centering mount 3 can be designed, for example, according to ISO 12164 or ISO 26623. However, other designs without a centering effect are also possible. A centering mount is not necessary, for example, if multiple clamping systems according to the invention are used in a workpiece clamping device in order to clamp a workpiece in the device.

In the figures, a "polygonal taper interface with flange contact surface" according to ISO26623 (Capto) is used as the centering mount 3 as an example. As shown in the figures, the centering mount 3 can be an additional or separate component that is accommodated by or in adjacent parts (housings, rotating spindles, stationary workpiece clamping devices, etc.).

Figure 6:
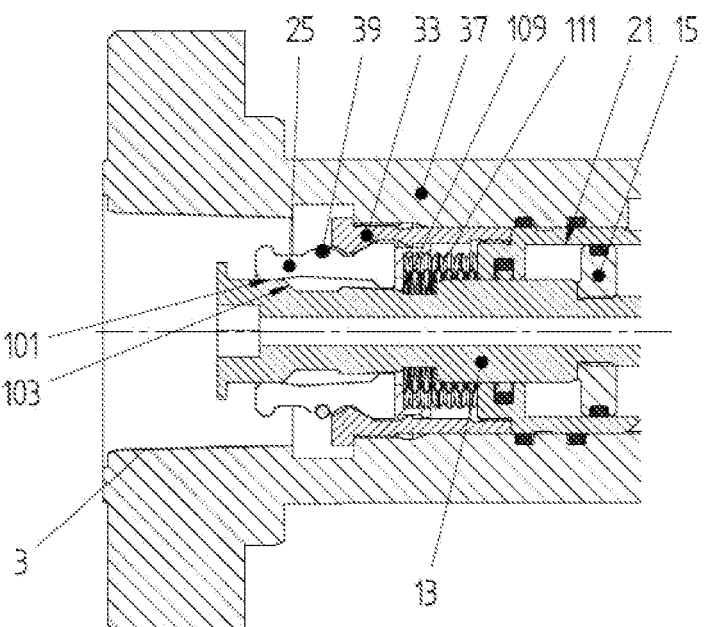
FIG. 6 shows a further exemplary embodiment of the invention.

However, the centering mount 3 can also be integrated in one of the "adjacent parts"; in this case, the adjacent part and centering mount are designed as one piece. A corresponding exemplary embodiment of an embodiment is shown in FIG. 6. This design requires less radial installation space; therefore, it is often used for rotating or driven spindles. The associated figure description for FIG. 6 also describes the design implications.

The following FIGS. 1 to 5 illustrate and explain the process of tensioning in various stages.

Figure 7:
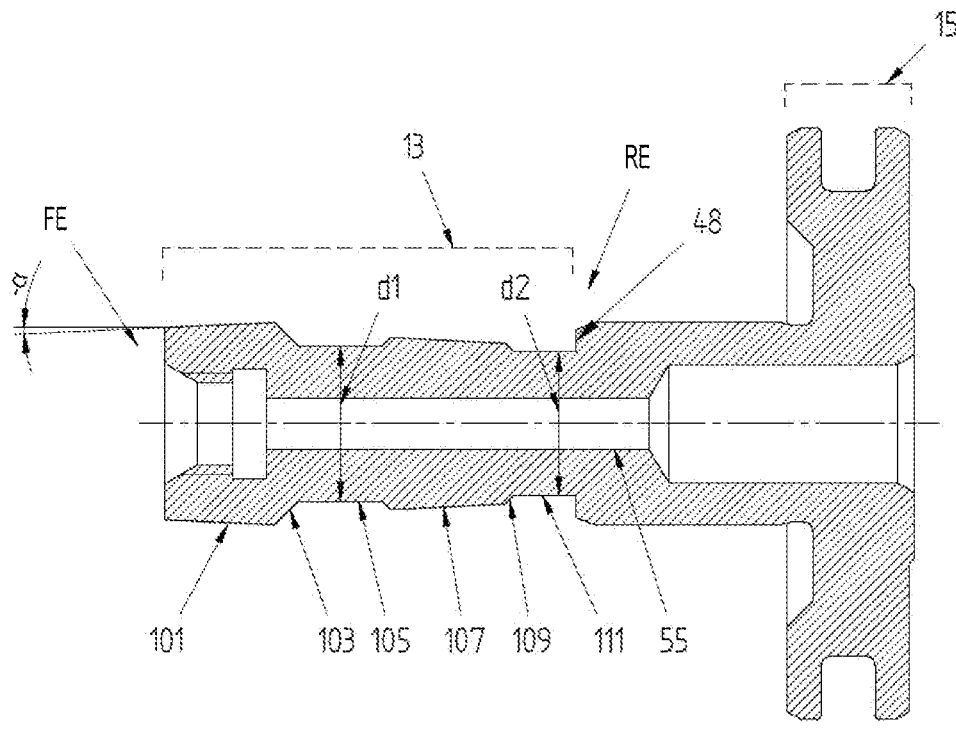
FIG. 7 shows a longitudinal section of a tension bolt according to the invention.

First, FIG. 7 shows a tension bolt 13 according to the invention. With this exemplary embodiment, a piston 15, which is part of a cylinder assembly, is connected to the tension bolt 13. In this figure, the functional surfaces according to the invention are clearly visible and marked with reference signs.

These are:

101: a first cylindrical section;

103: a first cone section;

105: a second cylindrical section;

107: a second cone section;

109: a third cone section and

111: a third cylindrical section.

A diameter change may be present between the second cylindrical section 105 and the second cone section 107.

A front end FE and a rear end RE are also shown. "Front" is the region of the centering mount 3 (see FIG. 1); the third cylindrical section 111 (see FIGS. 7 and 1) is located at the rear end RE of the tension bolt 13 in the terminology of the figure description; it is "rear."

Figure 8:
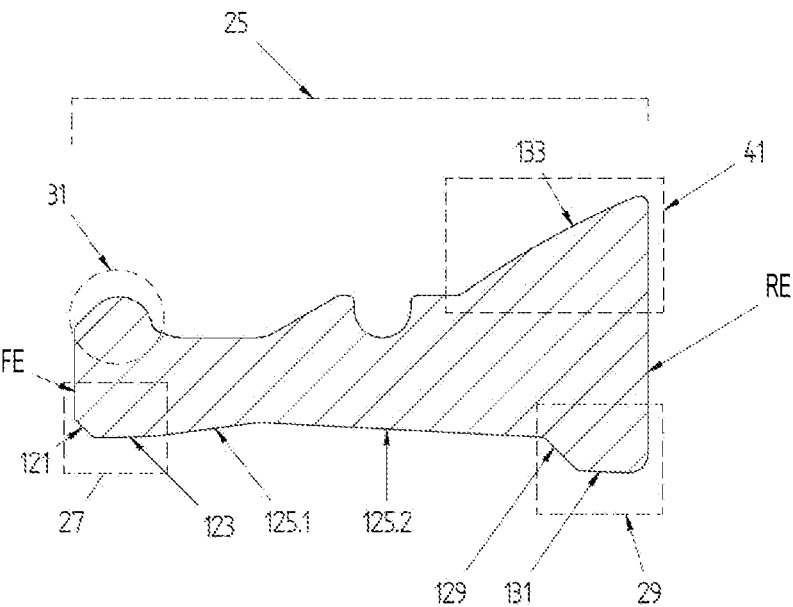
FIG. 8 shows a longitudinal section of a clamping segment according to the invention.

The functional surfaces 101 to 111 of the tension bolt 13 shown in FIG. 7 act together with corresponding contact surfaces on the "inner side" of the clamping segments. They are shown in FIG. 8 and are designated as follows:

A first contact surface 121 and a second contact surface 123 form the front lug 27.

A third contact surface 129 and a fourth contact surface 131 form the rear lug 29.

A (here, two-part) transition section 125 is not a functional surface in this sense. It creates the clearance required for the second cone section 107 of the tension bolt 13.

A front claw 31 and a rear claw 41 are formed on the outer side of the clamping segments 25. The rear claw 41 is substantially formed as a frustoconical or cone-shaped fifth contact surface 133 and may also be concave in shape. The shape of the front claw 31 is matched to the shape of the clamping groove 7 in the hollow shaft 5. From the already mentioned ISO standards, radius-shaped and chamfer-shaped designs are known, for example. In particular, a good positive-locking fit and the lowest possible surface pressure between the front claws 31 and the clamping groove 7 should be achieved if the clamping system is tensioned.

Back to FIG. 1: For reasons of clarity, the reference signs 101 to 133 are not shown in FIGS. 1 to 5. Nevertheless, such reference signs are used in the figure description.

Figure 11:
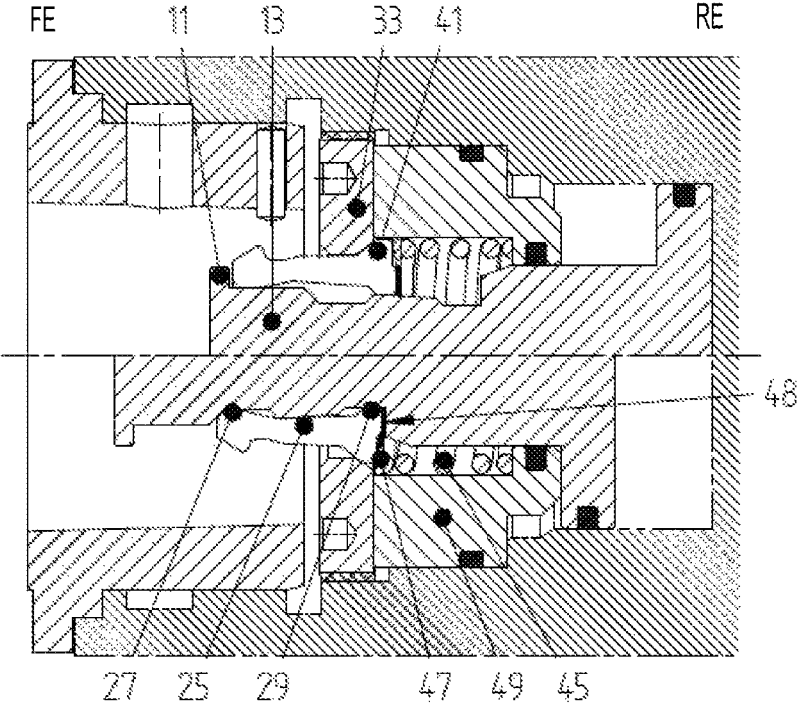
FIG. 11 shows a further exemplary embodiment of the invention.
Figure 11:
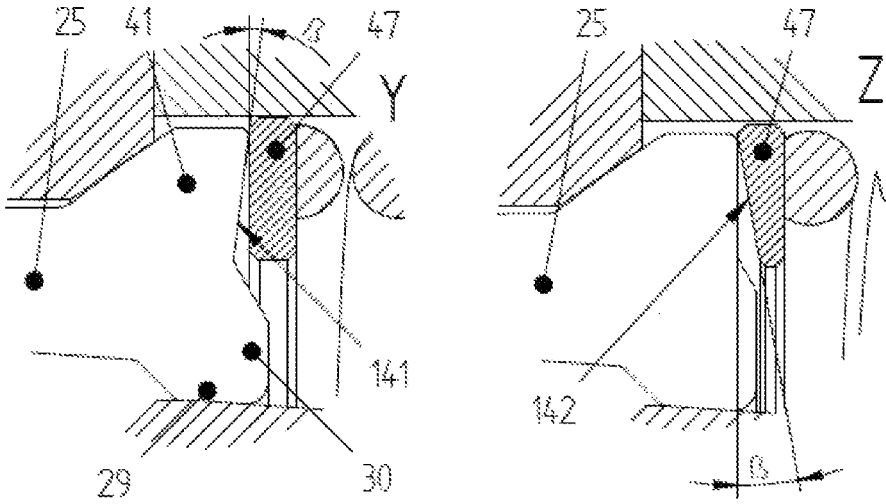

When the adapter 1 is inserted into the centering mount 3, the hollow shaft 5 is moved in the direction of a stop disk 11 into a defined position. The stop disk 11 is attached to a tension bolt 13 or integrated into the tension bolt 13 (one-piece design). FIG. 6 and FIG. 11 show an exemplary embodiment of a one-piece design.

The stop disk 11 represents a depth stop, so to speak, for the adapter 1 or the hollow shaft 5 and ensures that the adapter 1 assumes a defined position in the axial direction before the clamping process begins. This is done by bringing the base 19 of the hollow shaft 5 into contact with the stop disk 11. The relation of the clamping groove 7 of the hollow shaft 5 and the front clamping claws 31 of the clamping segment or segments 25 is important for automatic clamping; only if this relation is correct, the front clamping claws 31 can enter the clamping groove 7 of the hollow shaft 5. For this purpose, it may be useful to adjust the stop disk to the defined position by using the thread for adjustment or by machining the front of the stop disk to the desired dimension for achieving the position.

For centering mounts with a hollow shaft taper and a flange contact surface, the defined position is at an approximately 1.5 to 0.5 mm, typically at an approximately 1 mm flange contact surface distance between the end face of the centering mount 3 and the flat surface 9 of the adapter 1. The size of the distance depends on the type of adapter.

The stop disk 11 at the end of the tension bolt 13 has a large outer diameter. A "base" 19 of the hollow shaft comes in contact with the stop disk 11. This improves the flange contact surface of the adapter 1 and reduces the risk of the adapter 1 tilting relative to the centering mount 3.

At this point (i.e., prior to the start of the clamping process), the tension bolt 13 must be precisely positioned in its axial position. Only then does the stop disk 11 have an exact position in the axial direction and only then can the defined position of the adapter 1 mentioned above be ensured.

With this exemplary embodiment, the axial position of the tension bolt 13 is determined by its actuating means. In the figures, the actuating means is, by way of example, a piston-cylinder combination (also referred to as a "cylinder assembly"), the piston 15 of which is connected to the tension bolt 13 and the stop disk 11.

If the piston 15 is in contact with its front end stop 23, as shown in FIG. 1, the tension bolt 13 and the stop disk 11 have a defined axial position.

The double-acting piston 15, which actuates the tension bolt 13, is guided into a cylinder 21 in a fluid-tight manner. Depending on which cylinder chamber 21.1 or 21.2 is filled with a pressurized fluid, the piston 15 in the cylinder 21 moves in one direction or the other. In the axial position of the piston 15 at a front end stop 23 shown in FIG. 1, the cylinder chamber 21.2 has its maximum volume; the volume of the cylinder chamber 21.1 is at a minimum.

The clamping system according to the invention comprises a collet consisting of one or more clamping segments 25. The clamping segments 25 are arranged around the tension bolt 13 in a manner known per se. The clamping segments 25 may be interconnected or may exist as individual clamping segments 25.

At the front end FE, the first contact surface 121 and the second contact surface 123 form a front lug 27. At the rear end RE, the third contact surface 129 and the fourth contact surface 131 form a rear lug 29.

The lug 27 on the inner side of the clamping segments 25 is formed to abut the second cylindrical section 105 (diameter d1) of the tension bolt 13 in the position of the tension bolt 13 shown in FIG. 1.

The lug 29 on the inner side of the clamping segments 25 is formed to abut the third cylindrical section 111 (diameter $d_2$) of the tension bolt 13 in the position of the tension bolt 13 shown in FIG. 1.

In the cylindrical sections 101, 105 and 111, the tension bolt 13 is cylindrical; however, a slightly tapered, concave or convex design is also possible.

The outer diameter of the collet or the clamping segments 25 in the region of the front clamping claws 31 is so small in this exemplary embodiment and in this position of the tension bolt 13 that the hollow shaft 5 can be pushed over the front stop disk 11 and the enveloping circle diameter of the subsequent front clamping claws 31.

In the rear part of the clamping system according to the invention, a threaded ring 33 is screwed into the surrounding housing/adjacent part or a spindle housing 37. A cone 43 is formed on the threaded ring 33, which cone cooperates with the rear clamping claw 41 or the fifth contact surface 133 of the tension bolt 13. If the rear lugs 29 of the clamping segment or segments 25 are moved radially outward from the third or fourth contact surface 129, 131 of the tension bolt 13, the cone 43 deflects such movement at the rear end RE of the clamping segment or segments 25 into an axial movement of the clamping segments 25. In other words: In FIG. 1, the clamping segments 25 move to the right, i.e., in the direction of the rear end RE, if the tension bolt 13 is moved to the right. The positive-locking fit between the front claws 31 and the clamping groove 7 of the hollow shaft 5 pulls the adapter 1 into the centering mount 3. The clamping system is tensioned.

The inner diameter of the threaded ring 33 or the cone 43 is advantageously selected so that the threaded ring 33 can also be slid over the enveloping circle diameter of the front clamping claws. This must be possible at least in the position of the tension bolt 13 shown in FIG. 1. This simplifies the assembly and disassembly of the clamping system in a housing or spindle 37.

The enveloping circle diameter of the rear clamping claw 41, or the enveloping circle diameter of the fifth contact surface 133, is larger than the inner diameter of the cone 43 in every position.

If—for example, for reasons of space—a threaded ring 33 cannot be used, the cone 43 is integrated directly into the adjacent part (for example, the spindle housing 37). Then, the clamping segments 25 are mounted from the "rear."

To ensure that the collet or its clamping segments 25 always form the smallest enveloping circle diameter in this position, the clamping segments 25 must be pretensioned. This can be done by a tension spring 39 at the rear end RE of the collet or the clamping segments 25 or as shown in FIGS. 1 to 6 in an approximately central arrangement to the longitudinal extension of the clamping segments 25. It is also possible to connect the clamping segments 25 to one another in a spring-elastic manner to form a one-piece collet (without a separate spring element) (not shown).

The aim of these embodiments is to press the clamping segments 25 together centrally around the tension bolt 13 via the pretension. It is advantageous to arrange the tension spring 39 approximately in the center of the longitudinal extension of the clamping segments 25 so that the clamping segments 25 cannot tilt and come into contact with the tension bolt 13 evenly at the front and rear at the lugs 27 and 29.

A compression spring 45 in the rear region is supported, on the one hand, on an end face of the compression spring sleeve 49 and, in the state shown in the figure, presses against an optional intermediate disk 47. The intermediate disk 47, in turn, abuts in a positive-locking manner a shoulder of the threaded ring 33. It is also possible to omit the intermediate disk 47 such that the compression spring 45 bears directly against the shoulder of the threaded ring 33.

The intermediate disk 47 or the compression spring 45 can also abut a shoulder of the adjacent part or the spindle housing 37. Given such contact, the compression spring 45 cannot move the clamping segments 25 further in the direction of the front end FE than shown in FIG. 1 and can still be pretensioned.

The clamping segments 25 are pressed inward by the tension spring 39, as already described, and abut the tension bolt 13 with the front lug 27 and the rear lug 29.

In the axial direction, the position of the clamping segments 25 is determined by the (inner) cone 43 of the threaded ring 33, the intermediate disk 47 pretensioned by the compression spring 45 or the compression spring 45 and the tension bolt 13.

It may be advantageous, in order to create a slight pretension in the axial direction and not allow free vibrations, to have the clamping segments 25 abut with at least one of the lugs 27, 29 the first cone section 103 or the third cone section 109 and achieve a slight tensioning with respect to the pretensioned intermediate disk 47.

If the collet consists of multiple clamping segments 25 separated from one another, it is useful to manufacture them in such a way that the distance between the individual clamping segments 25, in the position in which they form the smallest diameter, is almost zero. When the clamping segments 25 are moved apart, they are thus distributed approximately equally over the circumference via the tension spring 39. This ensures that no or only very small imbalances arise when the clamping system is clamped; an additional separation unit that distributes the clamping segments 25 evenly over the circumference is not required. If this is nevertheless required (for example, for machine tool spindles driven at maximum speed), the separation can be created, for example, as part of the intermediate plate 47 by additional connecting bars or grooves with the corresponding counter guides on or between the clamping segments.

In the particular design of FIGS. 1 to 5, the compression spring 45 is received in a compression spring sleeve 49. The compression spring sleeve 49 is received in an offset 51 of a stepped bore 53 in the spindle 37 or adjacent part.

The offset 51 forms the longitudinal stop of the threaded ring 33 via the compression spring sleeve 49. At the same time, the compression spring sleeve 49 is held in place.

With the exemplary embodiment shown in FIG. 6, the longitudinal stop is implemented via a flange on the threaded ring 33. The flange can be polygonal in shape. The aim in each case is to ensure that as much diameter as possible is available for cylinder 21 in the case of hydraulic actuation. Then, specifically, the actuating forces provided by the piston 15 are at their maximum.

The cylinder 21 is arranged behind the compression spring sleeve 49. The compression spring sleeve 49 also serves as a front end stop 23 for the piston 15. The tension bolt 13 can also be moved in the axial direction in other ways to clamp or release the clamping system (for example, via eccentrics, wedges, etc.).

In connection with the cylinder assembly, the necessary seals in the piston 15 and also in the compression spring sleeve 49, for sealing the piston rod (=rear end of the tension bolt), are shown.

In this embodiment, the piston 15 is, for example, connected or designed in one piece with the tension bolt 13. Depending on the design, however, a multi-part design can also be useful. It is then only substantial that the piston 15 and the tension bolt 13 are connected to one another in the axial direction.

FIGS. 1 to 7 further show that the tension bolt 13 is pierced in the axial direction. The axial bore 55 (see FIG. 7) in the tension bolt 13 is used for the passage of a fluid (cooling lubricant (KSS)) or a fluid-air mixture (minimum quantity lubrication). In this case, the fluid is fed via a connection point from the adjacent parts (housing, spindle 37, etc.) via the actuating unit (cylinder 21 and piston 15) into the tension bolt 13.

The stop disk 11 at the front end FE of the tension bolt 13 has one or more through holes. This is where the fluid is transferred to the subsequent components (in this example, the adapter 1) that are to be supplied with fluid.

The design of such transfer can be sealed, channeled, or as shown here, without sealing or channeling.

With reference to FIGS. 2 to 5, the clamping of the self-locking clamping system according to the invention will now be explained.

FIG. 2 shows the clamping system in a position in which the tension bolt 13 has been moved slightly to the right compared to the open position shown in FIG. 1. This can be seen, for example, in the gap between the end stop 23 and the piston 15. The tension bolt 13 has traveled the same path. The clamping segments 25 come into contact with the first cone section 103 of the tension bolt 13 with their front lugs 27. That is, the clamping segments 25 are moved radially outward with their front ends. The clamping segments 25 still abut with their rear lugs 29 the third cylindrical section 111. Thus, the axial movement of the tension bolt 13 causes a first tilting movement of the clamping segments 25. The pivot point of the tilting movement is located at the rear lugs 29. This increases the enveloping circle diameter of the front clamping claws 31.

The first cone section 103 has an angle of inclination of 30° to 60° and preferably 45°. The clamping segments 25 are formed in the region of the front lug 27 at the point of contact with the first cone section 103 in such a way that they have at least a two-point support over a wide range and cannot tilt. In this case, the shape of the first contact surface 121 (see FIG. 8) can be a cone or even a slightly crowned cone contour in order to prevent pure edge supports.

The front clamping claws 31 of the clamping segments 25 are not yet in contact with the clamping groove 7 in the hollow shaft 5.

The hollow shaft 5 is held in contact with the stop disk 11 of the tension bolt 13 by the machine operator, but preferably by a handling device (not shown), such as a handling robot. This means that the adapter 1, and with it the hollow shaft 5, also moves into the centering mount together with the tension bolt 13 until the hollow shaft 5 comes to rest against the cone-shaped section of the centering mount 3. Then, it cannot initially move further in the axial direction. Such first axial retracting movement reduces the distance between the flat surface 9 of the adapter 1 and the contact surface of the centering mount 3 to a few $\frac{1}{10}$ mm.

Alternatively, however, the design also allows the adapter 1 to remain in the starting position shown in FIG. 1. Even then, there is sufficient catch space between the front clamping claws 31 and the clamping groove 7 of the hollow shaft 5 for the first path section described here. This allows the front clamping claws 31 of the clamping segments 25 to enter the clamping groove 7 without any hindrance.

During such first partial movement, the intermediate disk 47 is pressed against the end face of the threaded ring 33 by the compression spring 45 and thus remains axially stationary. If there is no intermediate disk 47, then the front end of the compression spring remains in contact with the threaded ring 33.

In FIG. 3, the clamping system is shown in a position in which the tension bolt 13 has moved slightly further to the right compared to the position 2 shown in FIG. 2.

In such position, the front lugs 27 have continued to migrate outward over the first cone section 103 until they reach the first cylindrical section 101 of the tension bolt 13. At the same time, the front clamping claws 31 of the clamping segments 25 have moved outward into the clamping groove 7; this has created a positive-locking fit between the front clamping claws 31 and the clamping groove 7 that can transmit forces in the axial direction.

Parallel to this, in this phase of the clamping process, the rear lugs 29 of the clamping segments 25 also move outward over the third cone section 109. This causes a first "large" radial stroke of the rear end of the clamping claws 25.

The third cone section 109 preferably has an angle of inclination of 45°, and may be in a range between 30° and 60°. Preferably, the angles of inclination of the first cone section 103 and the third cone section 109 are the same. An angle of inclination of 45° has also proven effective for the first cone section 103

The rear clamping claw 41, or the fifth contact surface 133 of the clamping segments 25, is always in contact with the cone 43 of the threaded ring 33. The cone 43 of the threaded ring 33 has its largest diameter in the direction of the rear end. The cone sections 103, 107, and 109 have their largest diameters in the direction of the front end. In other words: The cone 43 of the threaded ring 33 and the cone sections 103, 107 and 109 are oppositely oriented.

Therefore, the radial movement of the rear lugs 29 on the third cone section 109 causes a large first clamping stroke of the clamping segments 25, and thus also of the adapter 1, in the axial direction. This is brought about by the interaction of the inner cone 43 of the threaded ring 33 with the fifth contact surface 133 of the clamping segments 25, and of the rear lugs 29 with the third cone section 109.

The angle of inclination of the cone 43 in the threaded ring 33 to the center axis is preferably 30° to 35°. Angles of inclination from 20° to 60° are possible. By varying the angle of inclination, the force-motion conversion can be optimized.

At angles of inclination of 30° for the cone 43, the conversion of the diameter change in the region of the third cone section 109 and (at a later stage of the clamping process) the second cone section 107 of the tension bolt 13, into an axial displacement of the clamping segments 25, is increased by a factor of approximately 1.7. A smaller angle of inclination increases this factor; however, at the expense of a decreasing clamping force and an increased surface pressure between the clamping segment 25 and the tension bolt 13. Increasing the slope leads to a reduction of the factor.

The spacing between the front and rear lugs 27, 29 is matched so that, at the end of the travel of the rear lug 29 over the third cone section 109, the front lug 27 is located on the first cylindrical section 101 of the tension bolt 13. As a result, the front clamping claws 31 of the clamping segments 25 are radially locked in the circumferential clamping groove 7.

If the adapter 1 has been held in its initial axial position by the operator or, as a rule, by a handling system (for example, a robot), it is now pulled into the centering mount 3. At this stage, the handling system is no longer required for holding the adapter.

As the clamping segments 25 move rearward in the axial direction due to the retracting movement of the tension bolt 13 and the clamping stroke of the adapter 1 triggered by this, the stop disk 47 is pressed rearward against the force of the pretensioned compression spring 45: that is, the stop disk no longer presses against the threaded ring 33, as is clearly visible in FIG. 3.

In the next step shown in FIG. 4, the third path section, the (axial) clamping force required for tensioning between the hollow shaft 5 and the centering mount 3 is generated. In addition, the self-locking of the clamping system is generated.

As the tension bolt 13 continues to move axially rearward, the front lugs 27 move on the first cylindrical region 101 of the tension bolt 13. The second and third cone sections 107, 109 of the tension bolt 13 are drawn further into the clamping segments 25.

Depending on the design of the clamping groove 7, the first cylindrical region 101 can also be formed as a cone with a positive angle of inclination α with an amount less than or equal to 4° in order to further improve the relation between the travel of the tension bolt 13 and the axial clamping travel of the clamping segments 25. However, it is also possible to form the first cylindrical section 101 as a cone with a negative angle of inclination α with an amount less than or equal to 2° in order to increase self-locking in the later course of the clamping process.

In the region of the front clamping claws 31, in the illustrated exemplary embodiment with a cylindrical first cylinder section between clamping claws 31 and clamping groove 7, there is first an axial movement up to the clamping position and then no more axial displacement. The front region of the clamping segments 25 (front lug 27, front clamping claw 31) is now to be regarded as a joint.

As the tension bolt 13 continues to move, the rear lugs 29 of the clamping segments 25 are no longer pushed outward by the third cone section 109, but by the second cone section 107.

The second cone section 107 has a much smaller angle of inclination than the third cone section 109. The second cone section 107 ideally has an angle of inclination of less than arctan(μ). "μ" is the coefficient of friction of the material pairing of clamping segments 25 and tension bolt 13. In many cases (and under normal friction conditions), an angle of inclination of 3° to 4° works well. By using (DLC) coatings or targeted lubrication, such region can or must be functionally adapted.

The slope on the second cone section moves the rear lugs 29 of the clamping segments 25 further radially outward.

The wedge action between the rear clamping claw 41, or the fifth contact surface 133, and the cone 43 of the threaded ring 33 first leads to an axial movement up to the clamping position and then to a clamping force acting in the axial direction in the clamping segments 25, which is absorbed via the front clamping claws 31 and the clamping groove 7 and introduced into the hollow shaft 5 or the adapter 1. Such high clamping force results in the desired axial tensioning between the hollow shaft 7 and the centering mount 3.

FIG. 5 shows the clamping system according to the invention in the clamping position with self-locking.

The actuating unit (here, the cylinder assembly with the piston 15 and the cylinder 21) has built up the necessary actuating force and can now become force-free. In the case of the cylinder assembly, the fluid pressure can be lowered or depressurized.

The clamping segments 25 are connected in a positive-locking manner to the adapter 1 or its hollow shaft 5 via the front clamping claws 31 in the clamping groove 7.

At the same time, the front lugs 27 abut the first cylindrical section 101 of the tension bolt 13. In the radial direction, the front region of the clamping segments 25 is thus supported.

The rear clamping claws 41 of the clamping segments 25 abut the inner cone 43 of the threaded ring 33. At the same time, the rear lugs 29 of the collet segments 25 abut the second cone section 107 of the tension bolt 13.

As already explained in connection with FIG. 4, this results in a large axial clamping force in the clamping segments 25. Thus, the clamping segments 25 are loaded in tension; i.e., the rear region of the clamping segments 25 pulls on the front region of the clamping segments 25 and, via the positive-locking fit in the clamping groove 7, thus also on the adapter 1. The desired axial tensioning with high clamping force occurs between the hollow shaft 5 and the centering mount 3.

Due to the conical and even non-circular design (ISO 26623, Capto) of the interface between the adapter and the centering mount in this example, there is a tensioning of the components in the axial, radial and rotational directions. In the case of systems with flange contact surfaces (for example, ISO 26623 and ISO 12164), also for pretensioning of the same.

In addition, however, the angle of inclination of the cone 43 also causes large radial forces to act on the rear clamping claws 41, which transmit them via the rear lugs 29 to the second cone section 107 of the tension bolt 13.

Since the angle of inclination of the second cone section 107 is selected to be very small according to the invention, the radial forces transmitted by the rear lugs 29 to the second cone section 107 of the tension bolt 13 cause the tension bolt 13 to be locked in such position. Without an external force, the tension bolt 13 cannot change its position relative to the clamping segments 25 and the adapter 1. This means that the clamping system according to the invention is self-locking in the clamping position.

This means that the cylinder assembly can be depressurized after the clamping process has been completed; likewise, no spring is required to continuously exert an actuating force on the tension bolt 13 in the direction of the clamping position.

This is highly advantageous, because there is no need to supply pressurized hydraulic fluid to the cylinder assembly while the spindle 37 is being driven and is rotating.

Supplying the cylinder assembly with pressurized hydraulic fluid while the spindle 37 is rotating is technically very demanding and requires a lot of installation space.

Due to the self-locking design in the region of the second cone section, the initiated clamping force is maintained even if the actuating force of the cylinder assembly drops to zero.

Due to the force amplification of the clamping system according to the invention, the clamping force is 3 to 4 times greater than the actuating force applied by the cylinder assembly in the tensile direction.

FIG. 6 shows a further exemplary embodiment that corresponds functionally to the first exemplary embodiment. One difference is that the centering mount 3 is not designed as a separate component; rather, it is integrated into the spindle housing 37.

With this exemplary embodiment, the entire clamping system is designed to be so compact that it can be mounted through the inner diameter of the centering mount 3, i.e., from the front. This makes it possible to design the centering mount in one piece with the surrounding parts of the tool holder and to dispense with the two-piece structure.

Figure 9:
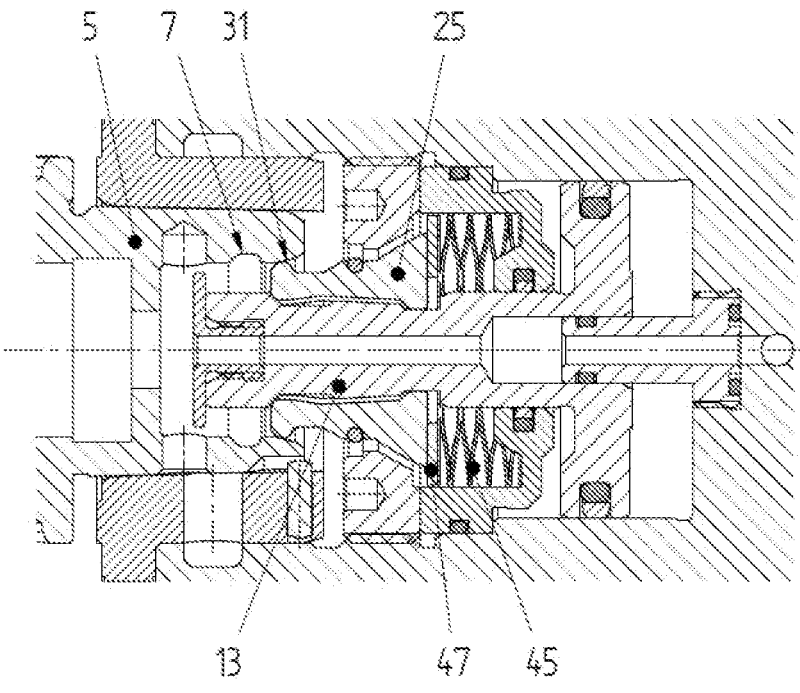
FIGS. 9 and 10 show an incorrect clamping of an adapter in different positions.
Figure 10:
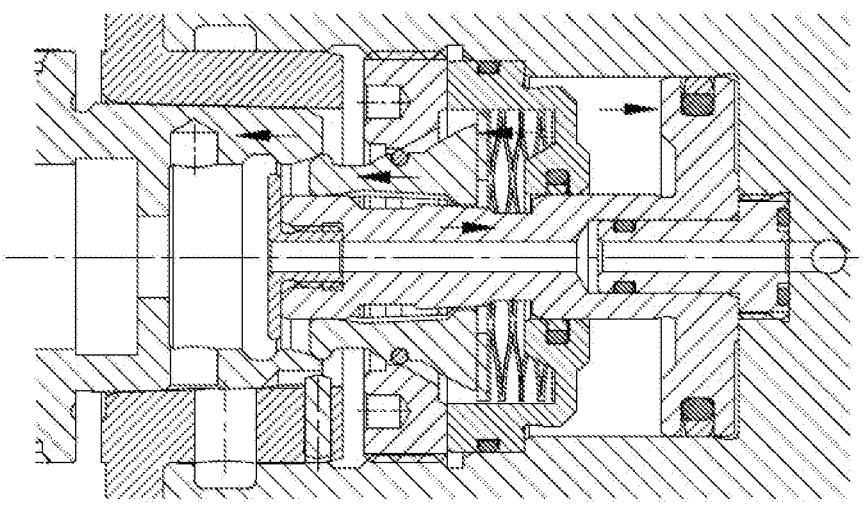

FIGS. 9 and 10 show an "incorrect clamping" of an adapter 1. On the basis of such figures, the advantageous feature of the clamping system according to the invention of being able to deflect rearward in such a case and thus prevent damage to the clamping system is explained.

In FIG. 9, the adapter 1 has not been pushed far enough into the centering mount 3, such that the front clamping claws 31 cannot enter the clamping groove of the hollow shaft 5; they are hindered in their movement radially outward by the hollow shaft 5.

As a result, the front lugs 27 do not arrive onto the first cylinder section 101 of the tension bolt 13. They remain on the first cone section 103 and follow the axial movement of the tension bolt 13. As a result, the clamping segments 25 press so hard against the intermediate disk 47 that it compresses the compression spring 45. As a result, the clamping segments 25 can deflect rearward in the event of incorrect clamping and are not damaged.

For the sake of clarity, no reference signs are marked in FIG. 10. In FIG. 10, the tension bolt 13 has moved further rearward compared to FIG. 9, driving the clamping segments 25 against the force of the compression spring 45 until the front clamping claws 31 at the end of the hollow shaft 5 or the insertion chamfer on the hollow shaft 5 move radially outward again, allowing the clamping segments 25 to slide from the first cone section 103 onto the first cylindrical section 101. Once this is done, the clamping segments 25 are independent of the movement of the tension bolt 13 and can slide freely on the cylindrical section 101. Pressurization of the compression spring 45 (with or without an intermediate disk 47) pushes the clamping segments 25 in the direction of the adapter 1 and pushes the adapter 1 out of the centering mount 3.

This is effected via the spring force of the compression spring 45. Other systems do not have such integrated emergency function. Such emergency function is a great advantage, as with the other systems the segments cannot sufficiently avoid the forces and are destroyed or massively damaged by the forces present in the system.

The integrated emergency function can effectively prevent hazards and damage, among other things, in the case of the error example explained below:

Assumption: The adapter 1 is pulled into the centering mount 3, although the clamping segments 25 are not in the correct position, i.e., in the clamping groove 7. This would result in the system appearing to be properly tensioned, even though there is no tensioning and the adapter can fall out due to machining forces. This case is also prevented by the structure according to the invention!

The ejection also prevents the adapter 1 from remaining unclamped in the centering mount 3 and the flange contact surfaces of 1 and 3 from touching.

Such emergency ejection is particularly important, as it provides direct feedback in automatic operation as to whether clamping has been carried out correctly. This is often realized by a so-called "flange contact surface check,"

with which there is a check as to whether the flat surface 9 of the adapter 1 and the flat surface of the centering mount 3 are in contact.

FIG. 11 shows another exemplary embodiment in section and without an adapter 1. The lower half shows the released state and the upper half shows the closed state. This exemplary embodiment largely corresponds in its design and functionality to the first example of FIGS. 1 to 5 such that reference is made in this respect to the description of the first exemplary embodiment. Only the reference signs necessary to explain the additional details and functions are entered.

The change substantially concerns the type of pretensioning of the clamping segments 25 in the released state. This ensures (as in the first exemplary embodiment) that the clamping segments 25 abut with their inner sides on the outer diameter of the tension bolt 13. However, here the clamping segments 25 are loaded by the compressive force of the spring 45 in such a way that the described support occurs.

On the one hand, the compression spring 45 in the rear region is supported on an end face of the compression spring sleeve 49 and presses against the intermediate disk 47 in the state shown in the figure. In turn, the intermediate disk 47 with this exemplary embodiment does not abut the threaded ring 33 in the open state; rather, it is guided in the compression spring sleeve 49 and always presses on the clamping segments 25. The inner diameter of the intermediate disk 47 is larger with this exemplary embodiment than in the first exemplary embodiment shown in FIGS. 1 to 6. This allows the stop disk 11 to be connected in one piece with the tension bolt 13 because it now fits through the bore in the intermediate disk 47.

In detail Y, the rear end of a clamping segment 25 is shown enlarged. As can be seen from this illustration, the clamping segment 25 has a projection 30 extending in the axial direction in the region of the rear lug 29. Such projection 30 has no contact with the compression spring 45 and the intermediate disk 47 in the installed state shown. It serves to shorten the installation length, since the intermediate disk 47 is arranged above the projection 30 and thus at the same time the intermediate disk 47 is an assembly aid for the clamping segments 25, since these are precentered via the inner diameter during assembly.

As can be seen from detail Z, the intermediate disk 47 is formed to be frustoconical on its side facing the clamping segment (see the angle R in detail Z). The resulting frustoconical surface has the reference sign 142. Such inclined position results in the contact surface between the clamping segment 25 and the intermediate disk 47 being displaced to the outer diameter of the intermediate disk 47 and to the radially outermost point of the rear clamping claw 41 (see detail Z). This results in a maximum lever arm from the contact surface to the pivot point at the point of contact between the rear lug 29 and the tension bolt 13. The clamping segments 25 are simultaneously pressed against the cone 43. Due to the resulting total torque around the points of contact, the clamping segments 25 are always pivoted in such a way that the front lug 27 is also pressed against the tension bolt 13. This applies not only to the end positions of the tension bolt 13 shown in FIG. 11, but also to all intermediate positions not shown.

The angle R of the frustoconical surface 142 is selected to be slightly greater than the pivot angle of the clamping segment 25 between the tensioned state and the released state so that the clamping segments 25 are in contact with the radially outermost point of the rear clamping claw 41 in any position.

Alternatively or additionally, it is also possible to slightly chamfer the rear end of the clamping segment 25 in the region of the rear clamping claw 41 (see the angle R in detail Y). The chamfer 141 has the same effect as the frustoconical design 142 of the intermediate disk 47 on its side facing the clamping segments 25. Often, this may eliminate the need for the tension spring 39 of the first exemplary embodiment. Since the chamfer 141 of the clamping claw 41 and the frustoconical design 142 of the intermediate disk 47 have the same function, the angle R was used in the description of both examples.

An offset 48/a diameter change is formed in the tension bolt 13, which serves as a (rear) stop for the clamping segments 25. As can be seen clearly in FIG. 11, the offset 48 acts with the rear lug 29. The offset 48 ensures that the clamping segments 25 cannot be displaced relative to one another in the axial direction when open. For example, if an adapter 1 is accidentally inserted into the centering mount 3 "at an angle" and thus comes into contact with individual clamping segment or segments 25, these cannot be accidentally pushed rearward; rather, they remain in their intended location. To avoid tensioning of the system, the offset 48 is displaced rearward by a few $1/10$ mm and normally has no contact with the clamping segments 25.

Figure 12:
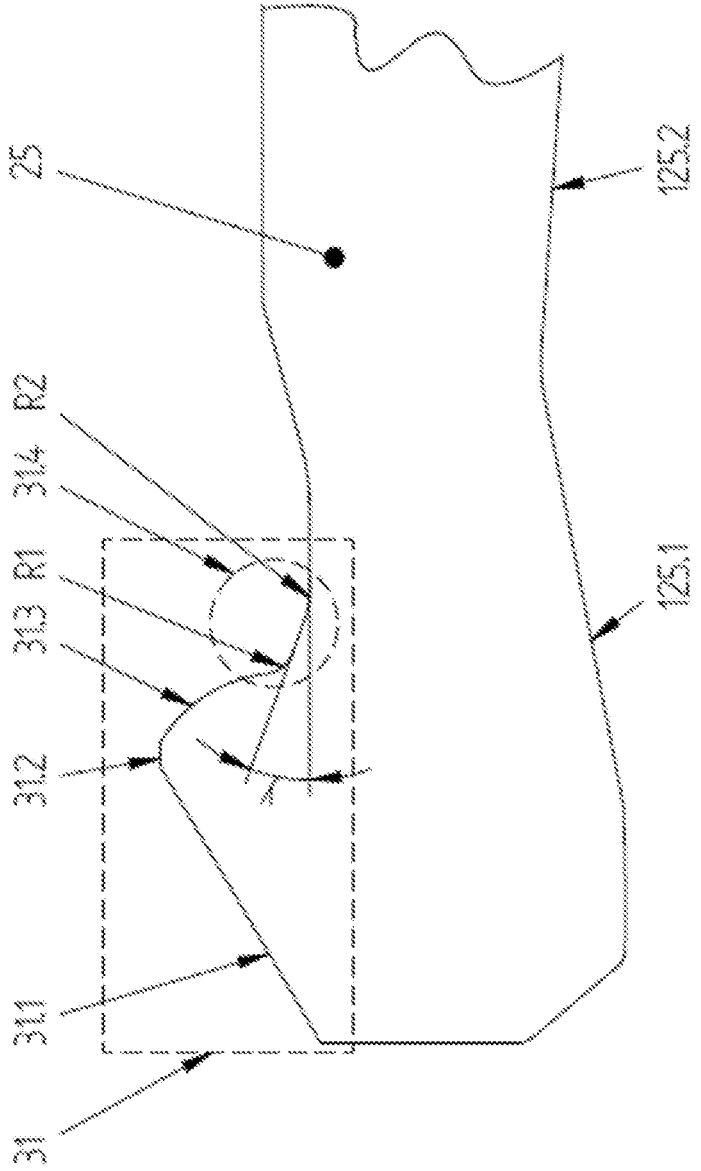
FIG. 12 shows a further exemplary embodiment of the front part of a clamping segment according to the invention in a longitudinal section.

FIG. 12 illustrates the front end of another exemplary embodiment of a clamping segment 25. This is a design of the clamping segment 25 for an adapter 1, which has a clamping groove 7 with a circular arc-shaped cross-section. Such clamping grooves are present, for example, in clamping systems according to ISO 26623 (Coromant Capto).

The front claw 31 comprises a chamfer 31.1 that is adapted to an insertion chamfer of the adapter 1 (not shown). In the event of incorrect clamping, the clamping segments 25, after being entrained rearward by the tension bolt 13, already abut with such chamfer 31.1 against the insertion chamfer of the adapter 1 and can deflect radially outward until they can slide from the first cone section (103) onto the first cylindrical section (101). As a result, the entire clamping claw 31 does not have to be pulled axially out of the adapter 1 for such function. This has the advantage that the spring travel of the spring 45 can be selected to be less than in the exemplary embodiment shown in FIG. 10. Nevertheless, the spring 45 can eject the adapter 1. This reduces the required spring length and thus also the overall installation length.

Where the front claw 31 has its largest diameter (see 31.2), it is cylindrical. Such short cylindrical section 31.2 is followed by a radius 31.3.

The cylindrical section 31.2 prevents unintentional radial jamming of the clamping segments 25 between the groove base of the clamping groove 7 and the surface 101 of the tension bolt 13. Typically, the outer diameter of the radius 31.3 is turned by $1/10$ mm in order to produce the cylindrical section 31.2.

The radius 31.3 is selected so that it always corresponds to the smallest possible radius of the clamping groove 7 of the adapter 1. This brings the contact point of the clamping segment or segments 25 against the clamping groove 7 as close as possible to the smallest diameter of the clamping groove 7. This reduces the leverage forces acting on the clamping segments 25 and improves the force flow.

The region 31.4 is designed to make optimum use of free spaces in the inner contour of the adapter 1 and to deflect the force flow slowly over the chamfer with the angle γ, which is preferably between 10 and 20°, and the adjacent radii R1 and R2. This reduces local tension peaks, increases the fatigue strength of the clamping segments 25, and significantly reduces the risk of spontaneous component failure due to the axial clamping forces.

The chamfers 125.1 and 125.2 on the inner side of the clamping segment 25 are designed to maximize the cross-sections in the clamping segments 25, without abutting the tension bolt 13 in the open position (see FIG. 11 below the center line) or interfering with the collapse of the clamping segments 25 to the open position. This also reduces the tensions in the clamping segments 25 and increases the fatigue strength of the clamping segments 25.

What is claimed is:

1. A clamping device for a hollow shaft, comprising one or more clamping segments and a tension bolt cooperating with the clamping segments, wherein each clamping segment has, at a front end on an outer side of the clamping segment, a front clamping claw, and, on an inner side of the clamping segment cooperating with the tension bolt, a front lug, wherein each clamping segment has, at a rear end on an outer side of the clamping segment, a rear clamping claw, and, on an inner side of the clamping segment cooperating with the tension bolt, a rear lug, wherein, in a clamping position, the front clamping claw of each clamping segment engages in a clamping groove of the hollow shaft and the rear clamping claw is pressed against a cone of a surrounding part or a spindle, wherein, in an open position, the front clamping claw of each clamping segment does not engage in the clamping groove of the hollow shaft, wherein, by means of axial displacement, the tension bolt moves the clamping segment or segments from the clamping position into the open position and from the open position to the clamping position, wherein the clamping segment or segments perform(s) a first pivoting movement during the transition from the open position to the clamping position, such that the front clamping claws of the clamping segments engage in a positively-locking manner in the clamping groove and form a joint for a subsequent second pivoting movement of the clamping segment or segments, wherein, during the second pivoting movement, the rear lugs of the clamping segment or segments slide on a third cone section of the tension bolt and press the rear clamping claws of the clamping segments against the cone of the surrounding part or the spindle and axially clamp the clamping segment or segments, and wherein, during a further axial movement of the tension bolt following the second pivoting movement, the rear lugs of the clamping segment or segments slide on a second cone section of the tension bolt, such that a self-locking effect is produced between the clamping segments and the tension bolt, the self-locking effect holding the tension bolt in position by friction between the rear lugs and the second cone section without an external force to maintain the clamping position.

2. The clamping device according to claim 1, characterized in that a first cylindrical section, a first cone section, a second cylindrical section, the second cone section, the third cone section, and a third cylindrical section are successively formed on the tension bolt, starting at a front end of the tension bolt.

3. The clamping device according to claim 1, characterized in that an angle of inclination of the second cone section is less than 5° or less than the arc tangent (arctan) of a coefficient of friction ($\mu$) of a material pairing at the contact surfaces between the clamping segment and the tension bolt.

4. The clamping device according to claim 1, characterized in that an angle of inclination of the second cone section is in a range between 3° and 5°.

5. The clamping device according to claim 1, characterized in that an angle of inclination of the first cone section and/or an angle of inclination of the third cone section is in a range between 30° and 60°.

6. The clamping device according to claim 5, characterized in that the angle of inclination of the first cone section and/or the angle of inclination of the third cone section is 45°.

7. The clamping device according to claim 1, characterized in that the second cone section and the third cone section merge into one another without a diameter change and without an intermediate cylindrical section.

8. The clamping device according to claim 2, characterized in that the front lugs of the clamping segment or segments, starting at the front end, have a first contact surface having an angle of inclination substantially corresponding to an angle of inclination of the first cone section and a second contact surface shaped to conform to the first cylindrical section.

9. The clamping device according to claim 2, characterized in that the rear lugs of the clamping segment or segments have a third contact surface having an angle of inclination substantially corresponding to an angle of inclination of the third cone section.

10. The clamping device according to claim 1, characterized in that the rear lugs of the clamping segment or segments have a fourth contact surface having an angle of inclination substantially corresponding to an angle of inclination of the second cone section.

11. The clamping device according to claim 1, characterized in that the rear clamping claws have a fifth contact surface, and in that the fifth contact surface has an angle of inclination substantially corresponding to an angle of inclination of the cone.

12. The clamping device according to claim 11, characterized in that an angle of inclination of the cone and/or an angle of inclination of a fifth contact surface of the clamping segments is in a range of 20° to 45°.

13. The clamping device according to claim 1, characterized in that the clamping segment or segments are supported with their rear end against a spring-loaded intermediate disk or directly against a compression spring, the compression spring being configured to permit the clamping segments to deflect in the axial direction when the clamping segments are unable to slide from the first cone section onto the first cylindrical section.

14. The clamping device according to claim 1, characterized in that a stop disk is provided at a front end of the tension bolt.

15. The clamping device according to claim 2, characterized in that the first cylindrical section has a slight negative taper defined by a negative angle of inclination $\alpha$, wherein a magnitude of the angle of inclination $\alpha$ is less or equal to 4°.

16. The clamping device according to claim 13, characterized in that the intermediate disk is formed to be frustoconical on its side facing the clamping segment.

17. The clamping device according to claim 13, characterized in that clamping segments have a chamfer at their rear ends, at least in some regions.

18. The clamping device according to claim 1, characterized in that an offset is formed on the tension bolt, which offset serves as a stop for the clamping segments.

19. The clamping device according to claim 1, characterized in that the cone is integrated into the adjacent part or the spindle or is designed as a separate component.

20. The clamping device according to claim 1, characterized in that the clamping device is part of a driven or stationary tool holder.

21. The clamping device according to claim 1, characterized in that the clamping device is used on a turret of a lathe.

* * * * *